(12) United States Patent
Eberlberger (10) Patent No.: US 10,752,308 B2
(45) Date of Patent: Aug. 25, 2020

(54) TELESCOPIC SEAT POST FOR BICYCLE FRAMES

(71) Applicant: LUPAAN GMBH, Linz (AT)

(72) Inventor: Lukas Eberlberger, Enns (AT)

(73) Assignee: Lupaan GmbH, Linz (AT)

( * ) Notice: Subject to any disclaimer, the term of this patent is extended or adjusted under 35 U.S.C. 154(b) by 390 days.

(21) Appl. No.: 15/746,442

(22) PCT Filed: Jul. 14, 2016

(86) PCT No.: PCT/AT2016/060006
§ 371 (c)(1),
(2) Date: Apr. 23, 2018

(87) PCT Pub. No.: WO2017/011845
PCT Pub. Date: Jan. 26, 2017

(65) Prior Publication Data
US 2018/0244331 A1    Aug. 30, 2018

(30) Foreign Application Priority Data
Jul. 21, 2015   (AT) .................................. A 481/2015

(51) Int. Cl.
*B62J 1/08*        (2006.01)
*B62K 19/36*      (2006.01)

(52) U.S. Cl.
CPC ................. *B62J 1/08* (2013.01); *B62K 19/36* (2013.01); *B62J 2001/085* (2013.01)

(58) Field of Classification Search
CPC ..... B62K 19/36; B62J 1/00; B62J 1/06; B62J 1/08; F16B 7/1427; F16B 7/1463; A47C 3/20; A47C 3/285
See application file for complete search history.

(56) References Cited

U.S. PATENT DOCUMENTS

| | | | | |
|---|---|---|---|---|
| 510,993 | A | * | 12/1893 | Riess ........................ B62J 1/08 297/215.13 |
| 617,831 | A | * | 1/1899 | Irish et al. ............ F16B 7/1427 403/104 |
| 2,644,504 | A | * | 7/1953 | Millard .................. B62K 19/36 403/107 |
| 3,228,647 | A | * | 1/1966 | Musianowycz ........ A47C 3/285 248/412 |
| 3,560,032 | A | * | 2/1971 | Cohen et al. ......... F16B 7/1463 403/104 |

(Continued)

FOREIGN PATENT DOCUMENTS

CN   2261975 Y    9/1997
DE   2900780 A1   7/1980
(Continued)

*Primary Examiner* — Daniel J Wiley
(74) *Attorney, Agent, or Firm* — Laurence A. Greenberg; Werner H. Stemer; Ralph E. Locher (57) ABSTRACT

A telescopic seat post for a bicycle frame has a tubular telescopic element for supporting a seat. The telescopic element is mounted so as to be slidable along a longitudinal axis of a seat tube of the bicycle frame. A tubular supporting element is mounted so as to be slidable within the telescopic element, the supporting element has a fastening section that can be connected to the seat tube by a fastener which can be inserted transversely to the longitudinal axis of the seat tube.

13 Claims, 7 Drawing Sheets

(56) References Cited

U.S. PATENT DOCUMENTS

| | | | | |
|---|---|---|---|---|
| 4,113,222 | A * | 9/1978 | Frinzel | F16B 7/1463 248/412 |
| 4,150,851 | A * | 4/1979 | Cienfuegos | B62K 19/36 248/408 |
| 4,182,508 | A | 1/1980 | Kallai et al. | |
| 4,706,916 | A * | 11/1987 | Cullmann | F16B 7/1463 248/168 |
| 4,850,733 | A * | 7/1989 | Shook | B62J 1/08 403/104 |
| 5,011,174 | A | 4/1991 | Ross-Clunis | |
| 5,036,873 | A * | 8/1991 | Clayton | A61H 3/02 135/69 |
| 5,044,592 | A * | 9/1991 | Cienfuegos | B62K 19/36 248/408 |
| 5,398,954 | A * | 3/1995 | Chonan | B62K 25/08 280/276 |
| 6,609,686 | B2 * | 8/2003 | Malizia | F16B 7/1409 248/125.8 |
| 7,364,179 | B1 | 4/2008 | McJunkin, Jr. et al. | |
| 7,370,877 | B2 * | 5/2008 | Refsum | B62B 9/20 280/655 |
| 7,673,936 | B2 * | 3/2010 | Hsu | B62J 1/08 297/215.13 |
| 8,317,261 | B2 * | 11/2012 | Walsh | B62K 19/36 297/215.13 |
| 2004/0208687 | A1 * | 10/2004 | Sicz | B62J 1/08 403/109.3 |
| 2006/0066074 | A1 * | 3/2006 | Turner | B62K 19/36 280/287 |
| 2006/0175792 | A1 * | 8/2006 | Sicz | B62J 1/06 280/200 |
| 2009/0324327 | A1 | 12/2009 | McAndrews et al. | |
| 2012/0228906 | A1 * | 9/2012 | McAndrews | B62K 19/18 297/215.13 |
| 2014/0112703 | A1 | 4/2014 | Chen | |

FOREIGN PATENT DOCUMENTS

| | | |
|---|---|---|
| EP | 2284068 A2 | 2/2011 |
| EP | 2574799 A1 | 4/2013 |
| FR | 2779406 A1 | 12/1999 |
| JP | 2005262900 A | 9/2005 |
| NL | 3001358 A | 1/1992 |

* cited by examiner

TELESCOPIC SEAT POST FOR BICYCLE FRAMES

BACKGROUND OF THE INVENTION

Field of the Invention

The invention relates to a telescopic seat post according to the preamble of the first independent claim.

In addition, a positioning apparatus according to the preamble of the second independent claim shall be defined.

Telescopic seat posts are already part of the prior art and are shown, for instance, in EP 2284068 A2. Traditional seat posts are adjustable along the seat tube by manual release of a clamping mechanism on the frame. The adjustment of the seat post along the seat tube is here realized by release of the clamping mechanism and subsequent pulling, or pushing-in, of the seat post along the seat tube. In order to be able to adjust the position of the seat post relative to the seat tube, the bicycle has to be dismounted. Variable or telescopic seat posts can be operated via a type of remote control either from under the seat or, through a "remote" circuit, from the handlebar of the bicycle. The clamping mechanism is here opened and the seat post extends by virtue of an energy source present therein (hydraulic, pneumatic, spring force, . . . ) and can subsequently be locked in a position via the clamping mechanism. The lowering of the seat post is realized by the own weight of the user. The user pushes the seat post into the seat tube with his own body weight and, via the "remote" clamping mechanism, locks the desired position of said seat post. Variable seat posts or telescopic seat posts, above all hydraulic, telescopic seat posts, are very maintenance-intensive due to a large number of components which are movable relative to one another. Hydraulic posts work by means of chambers in which a hydraulic medium, such as oil, is found. If a chamber becomes leaky, this carries the risk of a loss of oil and the working of the automatic adjustment of the telescopic seat post can no longer be assumed. Apart from the aspect of environmental pollution as a result of escaping oil, the aspect of the weight of the oil or other hydraulic media should also be taken into consideration. An oil-filled container increases the weight of the variable seat post, and thus also of the bicycle. The seat post cited as the prior art is held in its position relative to the seat tube by the hydraulic medium present in the chambers. A general adjustment and adaptation of the seat post to the rider can only be made by altering the oil volume in the chambers. One illustrative embodiment also shows a poorly accessible adjusting unit in the seat tube of the frame for adjusting the stop for the post, wherein the adjustment is realized via a cap nut from low down on the frame. To this end, the cycle must either be turned upside down, tilted or raised, in order to be able to perform the adjustment from below, through the seat tube, using a tool. In this, there is also the risk of the oil escaping from the chambers when the cap nut is removed. Furthermore, in this design, the seat tube cannot be connected as usual to the bottom bracket shell, since the seat tube has to be accessible from below. This is reflected in the torsional rigidity of the frame and the stability of the bicycle.

Other variable telescopic seat posts, as in the US 2009/0324327, for instance, have a plurality of mutually telescoped telescopic elements, which must be sealed off from one another. This seat post is placed as a unit into the seat tube and fixed with the seat clamp. The seat clamp here absorbs all the forces and transmits these, within a relatively small clamping zone, to the individual walls of the telescopic seat post. This zone must be dimensioned large enough to be able to compensate the clamping and seat forces, as is manifested in the weight of these components. Furthermore, components such as seat clamps and also the seat tube become worn in the fastening region if the telescopic seat posts are repeatedly changed. In addition, in self-contained systems as shown in the prior art, the seals or wipers, in the mounted state, often lie pointing upward. In the gap between the wipers and the movable regions of the posts, pollutants such as moisture and dust collect, which, upon the lowering movement of the post, can also get inside the post and thus cause damage to the sensitive components. As a result of the mutually engaging individual telescopic segments and the energy accumulator and locking system present therein, a very compact construction is necessary. As a result of this compact construction and the multi-nested elements, only small lift heights on the seat post are thus achieved. Multi-nested telescopic elements also result in one of the telescopic segments attaining a relatively small tube diameter and thus being underdimensioned for the generated forces. In many cases nor is it possible to adapt the self-contained post system in terms of its general overall length and to be able to adjust it to the realities of the cyclist. A variable telescopic seat post cannot easily be truncated and thus be adapted to the body measurements of the rider, such as, for instance, the inside leg length. Furthermore, telescopic seat posts of the known type often have a very pronounced latching mechanism in which the locking element engages in order to hold the seat post in position. These latching mechanisms weaken the cross section of the seat post, above all if they extend around the total periphery of the tubular seat post. In order to obtain a low cross-sectional weakening, a stronger wall must thus be used in respect of the telescopic segments, or these must be adequately supported by further tubes, which is detrimental to the weight balance of the seat post.

A further problem in existing systems, in particular in mechanical systems, is the unbraked extension speed of the movable element. Radial and axial grooves, rifling and other mechanisms prevent the possibility of throttling of the air flow. This is not very convenient in terms of use, nor is it compatible with small latch spacings, since the likelihood of an incorrect engagement position drastically increases. The undefined and user-dependent release and locking of the locking mechanism is a further criterion, so that no latch spacings smaller than 20 mm are attained, since the locking operation must take place with diminishing latch spacings and rising extension speed, in a faster and more defined manner. The resultant large latch spacings prevent the possibility of fine adjustment of the uppermost seat position by limiting the lift. It is possible that the rider cannot far enough limit the seat, with the result that he has to convert to a variable seat post with less lift.

BRIEF SUMMARY OF THE INVENTION

The object of the invention is to avoid the above-described drawbacks and to define a telescopic seat post which is improved in relation to the prior art, and an improved positioning apparatus.

This is achieved in the telescopic seat post according to the invention by virtue of the features of the first independent claim, and in the positioning apparatus according to the invention by virtue of the features of the second independent claim.

Because the supporting element has a fastening portion which can be connected to the seat tube via a fastening element which is insertable transversely to the longitudinal axis of the seat tube, axial loads on the seat post are transmitted directly into the seat tube and not via a region at the upper end of the seat tube, provided with a seat clamp. Furthermore, via a simple release of the fastening element, the complete seat post can be removed from the bicycle frame. In this, the bicycle has neither to be laid down, tilted nor raised, since the fastening means is positioned in easily accessible location on the seat tube.

Because the supporting element is connected to the fastening portion and the supporting element is mounted in the telescopic element, a favorable force transmission is realized from the telescopic element to the supporting element, and thus directly into the bicycle frame. No further tubes or telescopic elements are required in order to absorb the forces, which has a very positive impact in terms of the weight balance of the seat post, and thus also on the bicycle. Through the use of just two elements which are displaceable one into the other (telescopic element and supporting element), not only are weight savings made, but also a maximum system stroke for the adjustment of the seat post is attained. As a result of the system stroke, a largest possible range of different riders can be covered and a maximum freedom of movement provided.

The occurring forces which are generated in the use of the bicycle—in particular mountain bikes—are optimally absorbed—bending forces are transmitted directly into a stable and torsionally rigid region of the frame and do not have to be compensated by the seat post or a seat clamp.

Because the fastening of the fastening portion is realized by a releasable fastening element, the seat post, if need be, can be fitted or removed. This is necessary, for instance, in the loading and transporting of the bicycle into a vehicle, or in maintenance works.

If the fastening element is connected to at least one connecting portion of the seat tube, wherein the connecting portions are located substantially in a lower half of the seat tube, then a favorable force transmission is realized in the lower region of the seat tube, close to the bottom bracket. There the frame of the bicycle is very rigid and the force transmission of the seat post is at its most favorable. If the connecting portions are formed, for instance, by preshaped eyelets having depressions, the introduction of the fastening element is simplified. If at least one connecting portion here has a seat or a thread, a play-free fastening of the fastening element to the seat tube of the bicycle frame is realized.

It has here proved particularly advantageous if the seat post has an overload clutch, which in the mounted state, in the event of overload, allows a twisting of the seat post relative to the seat tube about the longitudinal axis of the seat tube. In the event of a fall with the bicycle, it may be that the bicycle seat makes contact with an obstacle and a shock load acts on the seat post. This results in damage to the seat post, the seat, or even the bicycle frame. As a result of the overload clutch, these generated forces can be compensated and damage prevented.

If the seat post, after a twisting of the overload clutch, can be restored without tools into its original position, or it reverts automatically into its original position, the cyclist, after the twisting of the overload clutch, can restore the seat post, and thus also the seat, to its correct position, or finds this already restored to the original shape. The cycle, after a fall or an accidental twisting of the seat post, can thus be used again without having to turn the seat post back into the original position with a tool.

It has here proved particularly advantageous that the overload clutch is positioned between supporting element and the fastening portion, since, in this region, the adjusting elements of the overload unit are easily reachable and can be optimally dimensioned. In the region into which forces are transmitted, the seat post, as a result of the overload clutch, yields, and the overload is able to be twisted. Above-situated (and also below-situated) components are in this case protected.

If the fastening portion, together with the fastening element, forms a compensating apparatus, which, in the mounted position of the seat post, compensates differences in shape, dimensions and tolerance between seat tube and the seat post, then this has the result that production tolerances or differences in shape between seat tube and seat post do not have to be compensated by shims, adapters or reworking. The seat post is slid into the seat tube, the fastening element is inserted and fastened. No additional adjustment works have to be conducted. The compensating apparatus assumes this function independently, since the compensating apparatus has a plurality of component parts which, in the loose state of the fastening element, are displaceable and/or twistable relative to one another and, in the fastened state of the fastening element in the fastening portion, are immovable relative to one another. In other words, as a result of the fastening of the fastening element, the compensating element is blocked and locked in its position. On the compensating apparatus is found the supporting element, which, after the fastening of the fastening element, remains in its position and holds the complete seat post in its position on the bicycle frame. Production tolerances on the seat tube can be compensated via this compensating apparatus.

If the supporting element has an energy accumulator or is formed by an energy accumulator—preferably a gas pressure cylinder—, then the telescopic element can be moved automatically along the supporting element. If a lockable gas pressure cylinder is used, this is reflected in the weight balance of the bicycle. Hydraulic media, elastomer or spring accumulators are significantly heavier than, for instance, a gas pressure cylinder.

It has here proved particularly advantageous that a sliding element is disposed on the seat tube, in which the telescopic element is mounted displaceably along the longitudinal axis, wherein at least one wiper is arranged on the slide ring. Radial forces which are generated at the seat post are transmitted via the sliding element into the upper end of the seat tube. The axial load which is generated by the body weight of the rider is transmitted by the fastening element into the frame in the lower region of the seat tube. Because only radial forces in the upper region of the seat tube have to be absorbed, and not, as in the use, for example, of a seat tube clamp with quick-release skewer, the axial forces also, this region can be formed by a plastics tube, which has a positive impact in terms of the weight balance of the bicycle. Plastic additionally has good sliding properties and is often also self-lubricating—thus requires no maintenance. In order to avoid ingress of pollutants, a wiper is arranged on the slide ring.

If the latching mechanism has radial grooves, which are disposed in the inner face of the telescopic element and are limited in the peripheral direction, then the danger of creating a reduction in cross section through oversized radial grooves which extend completely along their peripheral direction is reduced. Grooves which are limited in the peripheral direction thus reduce the danger of fracture on the seat post and open up the possibility of producing a seat post having a lower weight. The radial grooves limited in the peripheral direction are placed to the left and right of the bicycle longitudinal axis, so that, when the seat post is subjected to bending load, they lie in the neutral axis, and thus no weakening of the tube structure occurs.

BRIEF DESCRIPTION OF THE SEVERAL VIEWS OF THE DRAWING

Further details and advantages of the present invention are explained more closely below on the basis of the description of the figures, with reference to the illustrative embodiments represented in the drawings, in which.

DESCRIPTION OF THE INVENTION

Figure 1:
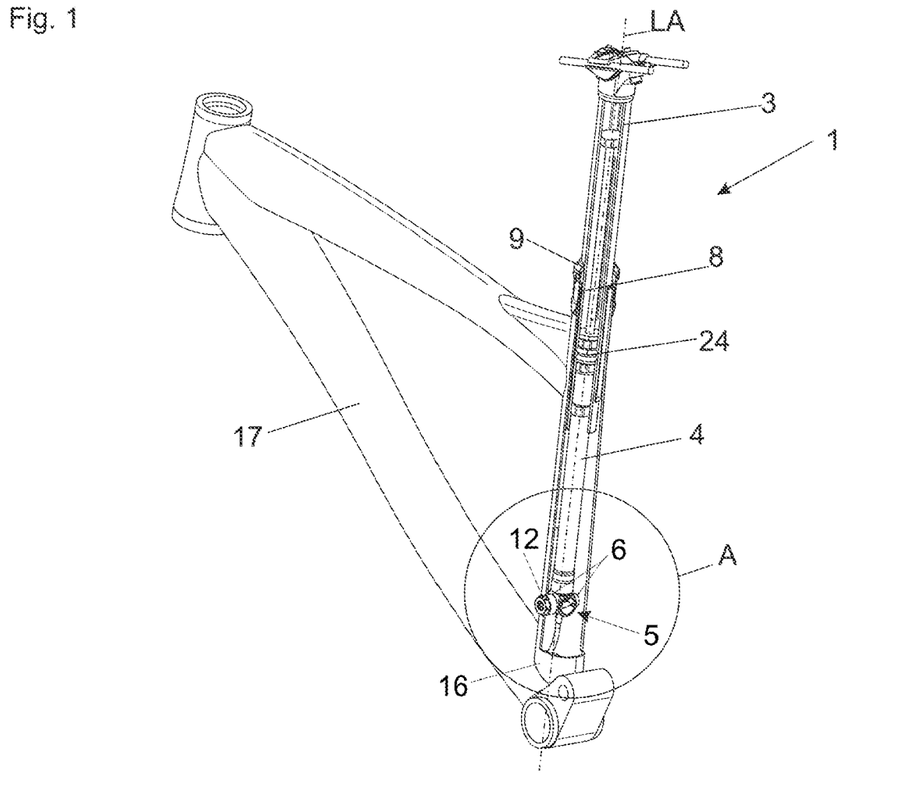
FIG. 1 shows in sectional representation a bicycle frame, with inserted seat post in mounted position.

FIG. 1 shows a bicycle frame 17, the seat tube 16 of which extends upward above the bottom bracket and forms a hollow body, in which is found the telescopic seat post 1. The telescopic seat post 1 is connected by the fastening portion 5, with the fastening element 12, to the seat tube 16. On or in the seat tube 16 is found at least one connecting portion 6, through which the fastening element 12 projects and subsequently makes contact with the fastening portion 5. The telescopic seat post 1 is at the upper end of the seat tube 16 mounted displaceably by the sliding element 8, on the seat tube 16, along the longitudinal axis LA. The telescopic element 3 here juts out of the seat tube 16 and the sliding element 8 present therein and is mounted displaceably along the longitudinal axis LA relative to the supporting element 4 or to the seat tube 16. A wiper 9 on the sliding element 8 prevents the pollutants from penetrating into the bicycle frame 17. At the upper end of the telescopic element 3 is found the receptacle for the bicycle seat. The fastening element 12 is inserted transversely to the longitudinal axis LA into the fastening portion 5.

Figure 2A:
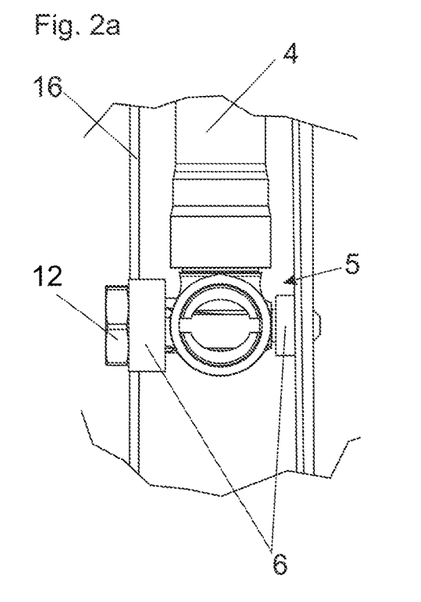
FIG. 2a, 2b show in detailed drawing: detail A from FIG. 1 in differently sectioned representations.

FIG. 2a shows a sectional drawing of the detail area A from FIG. 1, the seat tube 16 being shown in sectioned representation. The fastening element 12 here projects through the connecting portions 6 present on the seat tube 6. In this illustrative embodiment is shown how on one side of the seat tube 16 is found one connecting portion 6 and on the opposite side is found a second connecting portion 6. The fastening portion 5 is here located between the two connecting portions 6 and remains in this position. On the fastening portion 5 is arranged the supporting element 4. Thus forces which continue via the supporting element 4 downward into the bicycle frame are transmitted via the fastening portion 5 into the fastening element 12, and thus via the connecting portions 6 into the seat tube 16.

Figure 2B:
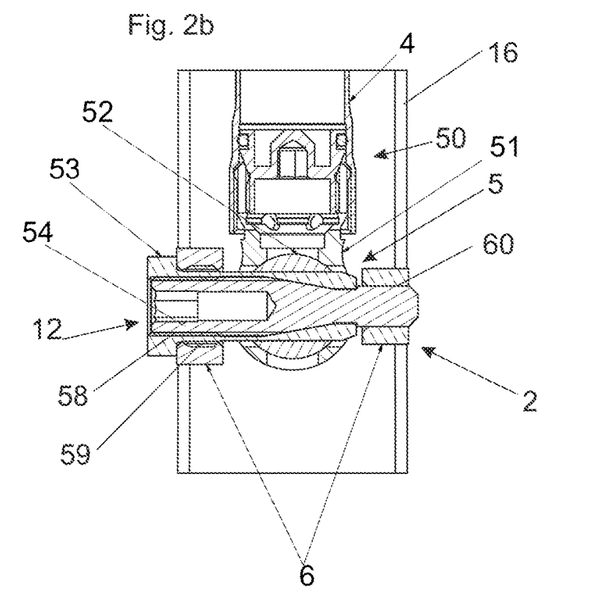

FIG. 2b shows a sectional representation of the compensating apparatus 2 and of the overload clutch 50. The compensating apparatus 2 consists of a plurality of individual parts, such as, for example, the fastening element 12 and the fastening portion 5. The fastening element 12 consists of an outer casing 53 and an expansion element 54 displaceable therein. By a movement of the expansion element 54 into the outer casing 53, the outer casing 53 is expanded outward. The longitudinal adjustment of expansion element 54 relative to the outer casing 53 is achieved by the adjusting thread 58, but can also be produced by means of a quick-release skewer. The outer casing 53 itself likewise has a fastening thread 59, which corresponds with the connecting portion 6. Instead of the fastening thread 59, it is here also possible to resort to a different fastening option, such as, for instance, a quick-release skewer with eccentric or toggle lever. The fastening portion 5 likewise has twistable and longitudinally displaceable elements, which are locked in their shape by the expansion of the outer casing 53. These are illustrated in greater detail in FIG. 4. The overload clutch 50, in this illustrative embodiment directly connected to the fastening portion 5, is constructed as a slipping clutch. At a certain overload, the supporting element 4 can thus be rotated about the longitudinal axis LA. The clutch can be configured as a friction clutch, claw clutch, or another type of clutch. A spring element on the clutch could lead, for example, for an automatic resetting of the seat post 1 relative to the seat tube 16.

Figure 3:
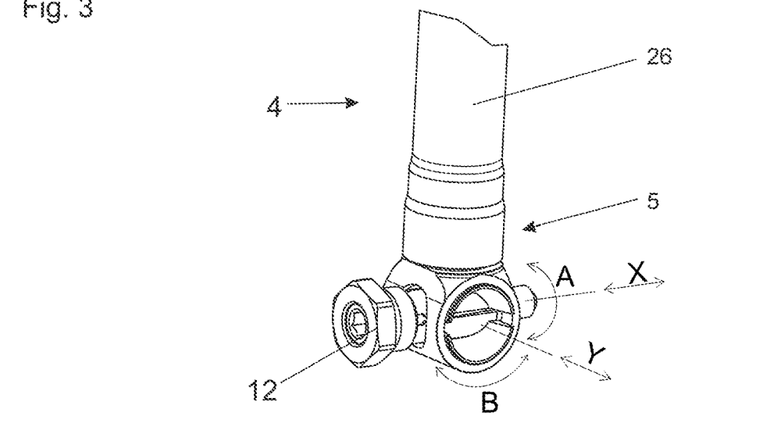
FIG. 3 shows overload clutch and compensating apparatus on supporting element.

FIG. 3 shows the compensating apparatus 2 in the unloaded state. By virtue of the movable individual parts, rotary movements about the axis X and about the axis Y are possible—this is shown by the arrows A and B respectively. Furthermore, an adjustment along the axes X and Y is possible, as is likewise represented by arrows. In the unloaded state, the fastening portion 5 can thus move about and along these axes relative to the fastening element 12. If the expansion element 54 is displaced inward in the fastening element 12, the movements of the individual movable elements are blocked relative to one another by the expansion of the outer casing 53.

Figure 4:
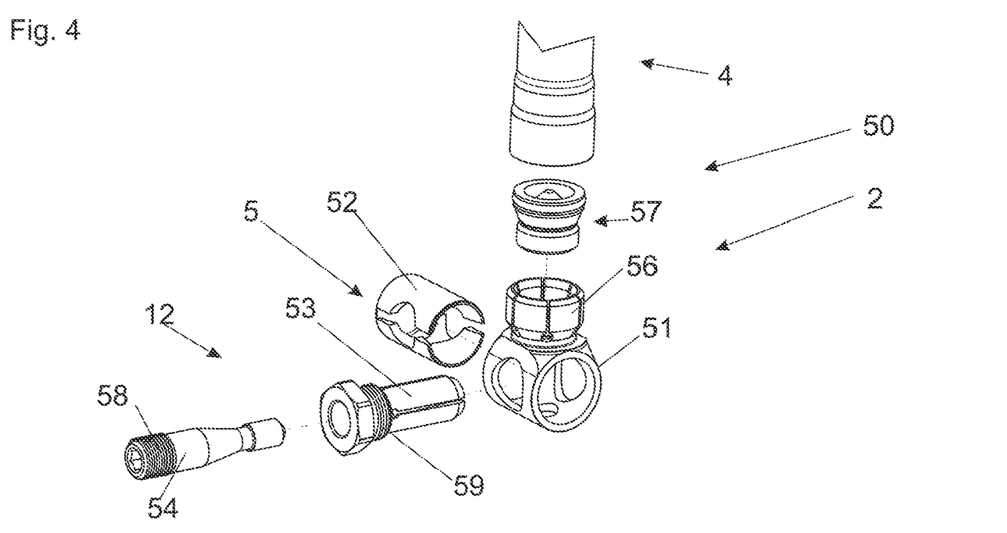
FIG. 4 shows exploded drawing of overload clutch and compensating apparatus.

FIG. 4 shows an exploded representation of the fastening element 12 and of the fastening portion 5 and overload clutch 50. The expansion element 54 is screwed via an adjusting thread 58 into the outer casing 53. A longitudinal adjustment of the expansion element 54 is here made relative to the outer casing 53. The longitudinal adjustment can also be realized via a different design tool, such as, for example, a lever on an eccentric (see FIG. 6). The outer casing 53 is here expanded radially. The outer casing 53 has a fastening thread 59, which subsequently makes contact with the frame of the vehicle via the connecting portions 6 (not represented in this figure). The fastening can also be realized differently, such as, for example, by a quick-release skewer known from the bicycle sector. The outer casing 53 engages in an insert 52. The insert 52 too is radially expandable and, upon expansion of the outer casing 53, is likewise expanded radially. This radial expansion is transmitted to the body element 51, wherein, as a result of the expansion forces transmitted from outer casing 53 to the insert 52, the individual component parts are no longer freely movable relative to one another. In this way, in the untensioned state of the compensating apparatus, the outer casing 53 can be moved freely relative to the insert 52, and, in turn, the assembly of outer casing 53 and insert 52 can be moved freely relative to the body element 51 along the axes shown in FIG. 3 and about these axes. Upon expansion by the expansion element 54, these movements are blocked. After having being relieved of load, the individual expandable component parts elastically regain their original shape.

Figure 5:
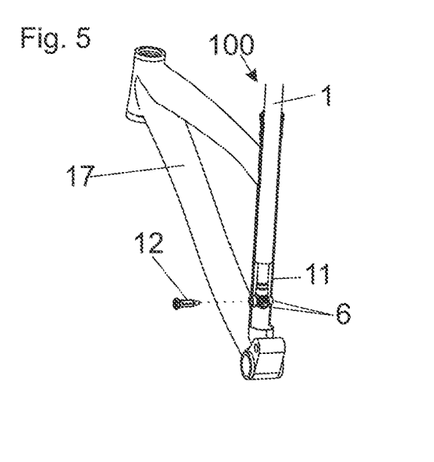
FIG. 5 shows the installation of seat post and fastening element.

FIG. 5 shows the installation of the seat post 1 into the bicycle frame 17. Here, prior to the sliding of the telescopic seat post into the seat tube 16, the fastening element 12 is removed. Following sliding of the telescopic seat post 1 into the seat tube 16, the fastening means 12 is inserted into the at least one connecting portion 6 and subsequently fastened.

Figure 6:
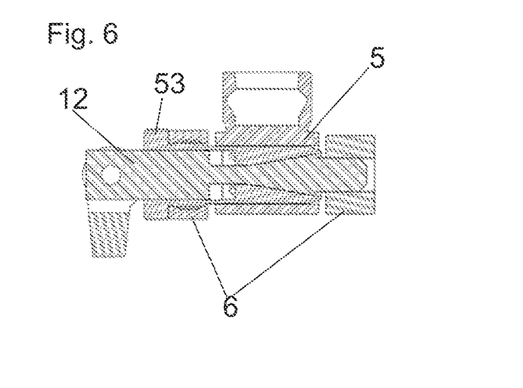
FIG. 6 shows fastening element with quick-release skewer.

FIG. 6 shows a variant of the fastening means 12 constructed as a quick-release skewer having an eccentric. Upon actuation of the quick-release skewer, the outer casing 53 is expanded, since the fastening means is pushed off from the at least one connecting portion 6. This type of connection can also be combined with a compensating apparatus 2, as shown in FIG. 2b.

Figure 7:
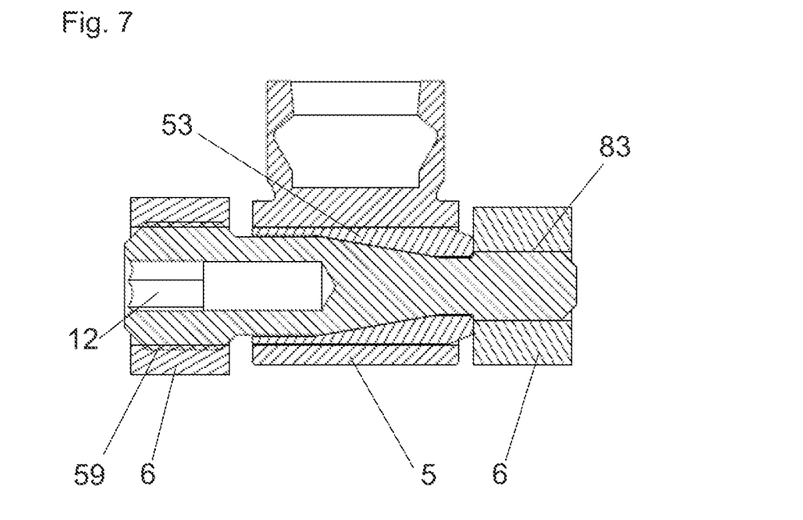
FIG. 7 shows variant of fastening means.

FIG. 7 shows a further, simplified variant of the fastening means 12. Here, the outer casing 53 is directly pushed off from one of the connecting portions 6 as soon as the fastening means 12 is inserted therein. One of the connecting portions 6 here additionally has a seat 83 for a play-free connection to the fastening means 12. The further connecting portion 6 has the fastening region for the fastening means 12—in this illustrative embodiment the fastening thread 59. This type of connection can also be combined with a compensating apparatus 2, as shown in FIG. 2b. Instead of a combination of seat 83 and fastening thread 59, also just one connection can be made via fastening threads 59 in both connecting portions. It is also conceivable that the fastening element 12 is inserted directly into the fastening portion 5 and that no compensating apparatus 2 is used. The fastening element 12 can here be configured without a cone.

Figure 8:
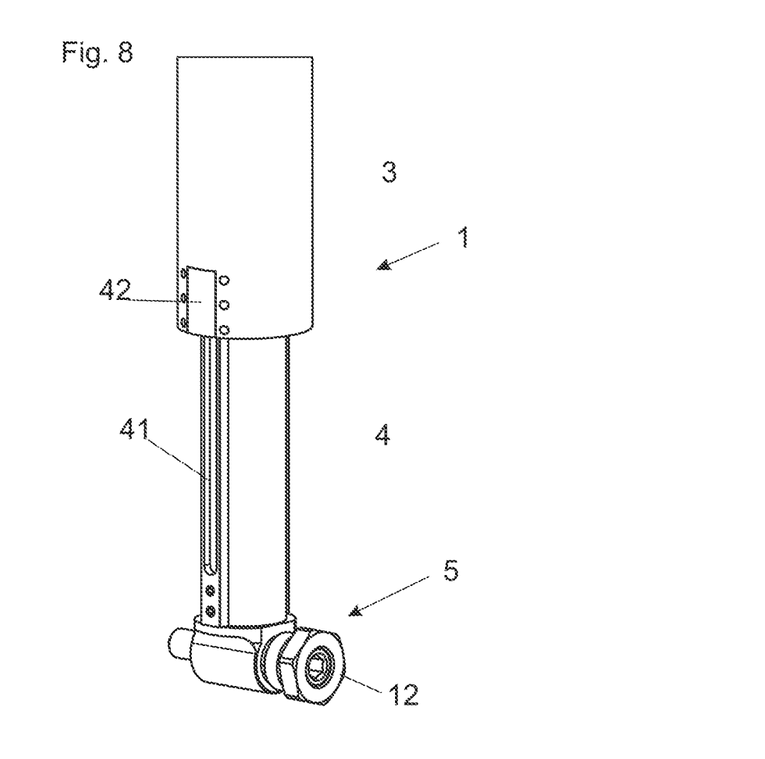
FIG. 8 shows variant of guide groove, supporting element, to telescopic element.

FIG. 8 shows a variant of the anti-twist protection between telescopic element 3 and supporting element 4. Parallel to the longitudinal axis LA of the seat post 1, a longitudinal groove 41 here extends in the surface of the supporting element 4. In this longitudinal groove engages the guide portion 42, which is fixedly connected to the telescopic element 3. Thus a play-free and stable anti-twist protection is formed, the forces acting on the telescopic element 3 are optimally relayed via the anti-twist protection to the supporting element and transferred via the fastening means 12 to the bicycle frame 17.

Figure 9:
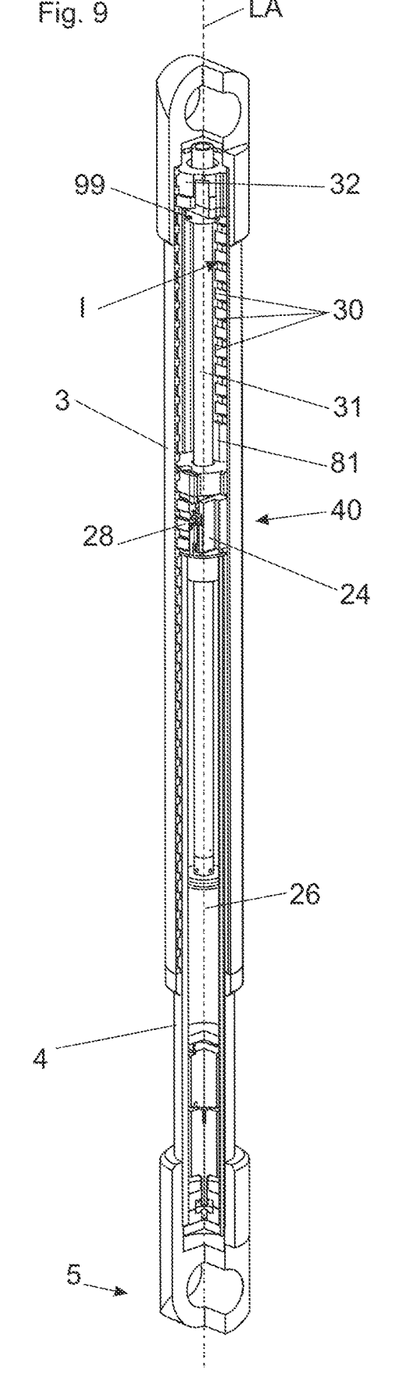
FIG. 9 shows a positioning apparatus in a sectional representation.

FIG. 9 shows a positioning apparatus 40 having a latching mechanism 30 and having a locking apparatus 24 comprising at least one latching element 28, which latter is engageable in the latching mechanism 30 and is mounted movably on the locking apparatus 24. The locking apparatus 24 is fixedly connected to the supporting element 4 and the supporting element 4 has an energy source 26. The energy source 26 is constructed, for instance, as a gas pressure spring, the rod 31 of which—in other words: cylinder rod—is in contact, via the rod adapter and the rod locking mechanism 32, with the latching mechanism 30 of the telescopic element 3. If the telescopic element 3 is moved and the locking apparatus 24 is in an open position (thus not engaging in the latching mechanism 30), the telescopic element 3 can be moved along its longitudinal axis LA and the supporting element 4. The latching mechanism 30 is located on the inner side of the telescopic element 3 and is thus protected from pollutants. The locking apparatus 24 too is built-in and is mounted such that it is protected from environmental influences. The surface of the supporting element 4 corresponds with the shape of the inner side of the telescopic element 3. This can be realized either directly or by sliding elements, and/or seals, present between the telescopic element 3 and the supporting element 4. A play-free displacement of the telescopic element 3 on the supporting element 4 is thus ensured.

Figure 10:
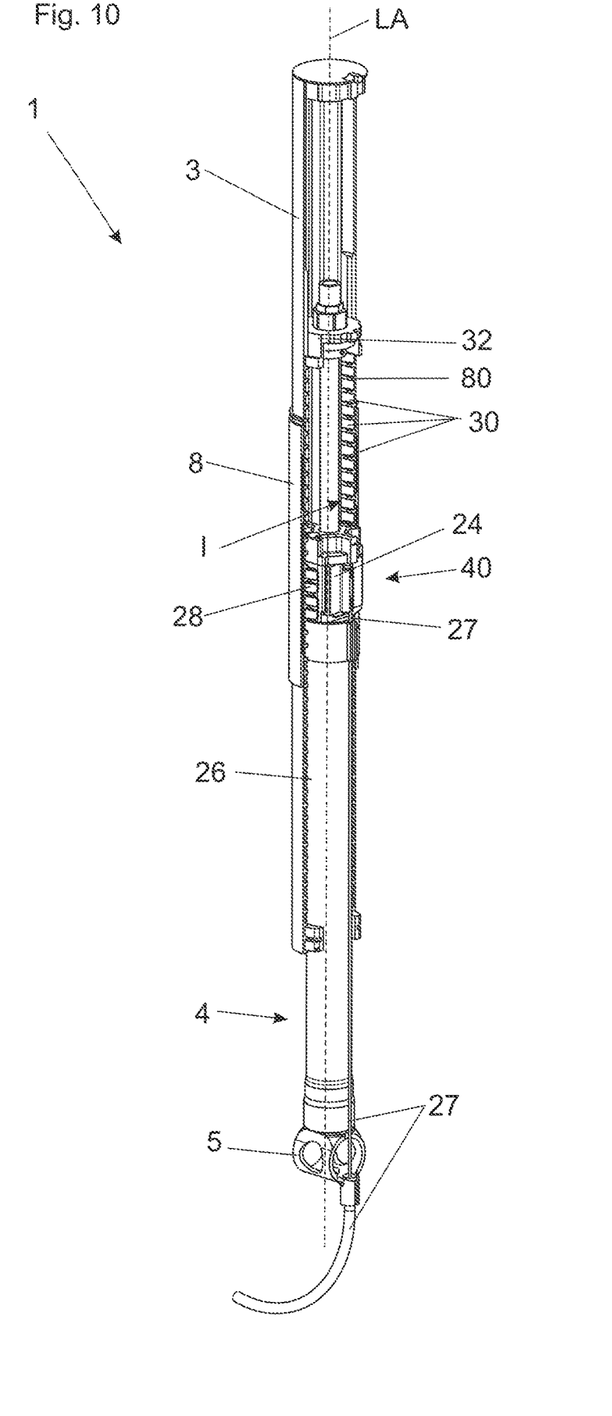
FIG. 10 shows a usage example of the positioning apparatus in a telescopic seat post.

FIG. 10 shows the use of the positioning apparatus 40 in a telescopic seat post for a bicycle. Here, via an actuator 27, the locking apparatus 24 is brought either into an open position or into a closed position. The at least one latching element 28 is actuated via the actuator 27. If traction is applied, for instance, in the actuator 27, the at least one latching element retracts radially in the direction of the longitudinal axis LA and no longer has contact with the latching mechanism 30. Thus the locking apparatus 24 has been brought into an open position and the telescopic element 3 can be displaced along the longitudinal axis LA relative to the supporting element 4. If no force is exerted on the actuator 27, the at least one latching element 28 returns abruptly into the closed position and establishes contact with the latching mechanism 30. A displacement of the telescopic element 3 along the longitudinal axis LA and along the supporting element 4 is thus no longer possible. The telescopic element 3 can additionally be altered in terms of its position relative to the supporting element 4 via the rod locking mechanism 32. Via this adjustment, the actual length of the telescopic seat post 1 can be basically adjusted. By means of this mechanism, the lower stop point or the minimum seat height is adjusted. Via a stop ring 98, which is adjustable along the latching mechanism 30, or via a stroke limitation of the rod 31 (see FIG. 15b), the maximum seat position, and thus the system stroke, can be adjusted. Persons having a large inside leg length can thus adapt the maximum length of the telescopic seat post 1 to their physical characteristics, as too can cyclists having a shorter inside leg length. The basic adjustment of the telescopic seat post 1 is thus realized via the rod locking mechanism 32, the stop ring 98 or a stroke limitation of the rod 31 (see FIG. 15b), the section-by-section positioning along the longitudinal axis during travel of the bicycle is realized via the locking apparatus 24. The telescopic seat post 1 is connected via the fastening portion 5 to the bicycle frame 17 (not represented in this figure).

Figure 11A:
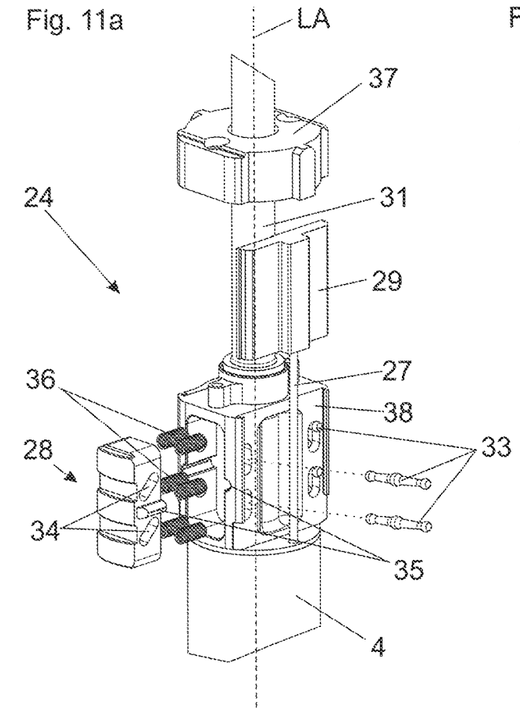
FIG. 11a, 11b show exploded drawings of locking apparatus.

FIG. 11a shows the locking apparatus 24 having at least one latching element 28, which, via sensors 35, is connected to a housing 38. Between the at least one latching element 28 and the housing 38 is found at least one restoring unit 36 in the form of a spring, an elastomer or, indeed, a hydraulic or pneumatic ram. By the at least one restoring unit 36, the latching element 28 is permanently pushed radially away from the longitudinal axis LA or transversely to the longitudinal axis LA and spread away from the housing 38. The latching element 28 here engages in the latching mechanism 30 (not represented in this figure). As a result of the at least one restoring unit 36, a self-locking fixation of the at least one latching element 28 on the latching mechanism 30 is thus obtained. The at least one latching element 28 is moved via diverters 33, which are movably mounted in the housing 38, toward the at least one restoring unit 36. The diverter 33 can here be constructed—as represented in FIG. 11a—as a tilt lever: on one side, the diverter 33 is mounted with its head articulately and rigidly relative to the longitudinal axis LA, the middle region of the diverter 33 engages in an oblique face 34 of the latching element 28 and, at an end facing away from the head, the diverter 33 is moved. Through the contact of the diverter 33 with the oblique face 43, the latching element 28 is moved. The movement of the diverter 33 is realized via the actuating element 29. The actuating element 29 is connected to the housing 38 such that it is movable along the longitudinal axis LA. The diverters 33 engage in this longitudinally movable actuating element 29 and are moved relative to the oblique faces 34 on the latching element 28. Through the restoring force of the at least one restoring unit 36 and the counteracting force by the actuating element 29 and the actuator 27 present thereon, the latching element 28 is moved away from the housing 38 or drawn closer to the housing 38.

Figure 11B:
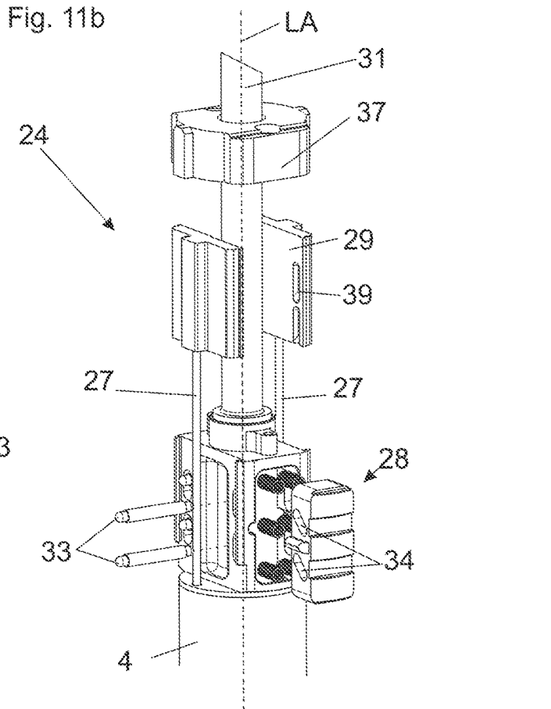

FIG. 11b shows a further illustrative embodiment of the locking unit 24. The diverters 33 are here not constructed as tilt levers, but rather are supported at their two ends by respectively an actuating element 29. As a result of the two-sided mounting of the actuating elements 29 and the connection of the actuating elements 29 to the actuators 27, the diverters 33 are moved along the longitudinal axis LA and also along the oblique faces 34 of the latching element 28. As also depicted in FIG. 13a, the movement of the diverters 33 results in the latching element 28 being moved radially away from the housing 38 or being drawn closer to this same, and in the latching element 28 moving into an open or closed position.

Figure 12:
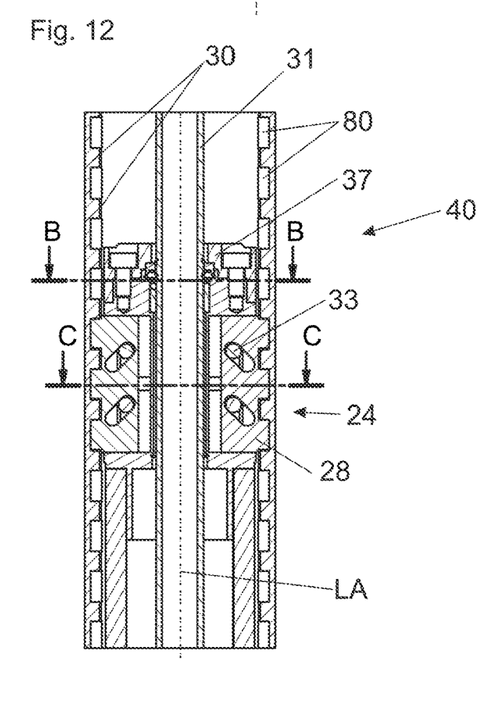
FIG. 12 shows sectional representation of positioning apparatus

FIG. 12 shows a positioning unit 40 in sectional representation in detail. The latching mechanism 30 consists of the radial grooves 80, in which the latching elements 28 engage. Along the rod 31 is found at least one guide element 37, which connects the telescopic element 3 in a radially play-free manner to the rod 31. The rod 31 is a component part of the supporting element 4. Furthermore, arranged between rod 31 and telescopic element 3 is found the locking apparatus 24 having the latching elements 28.

Figure 13A:
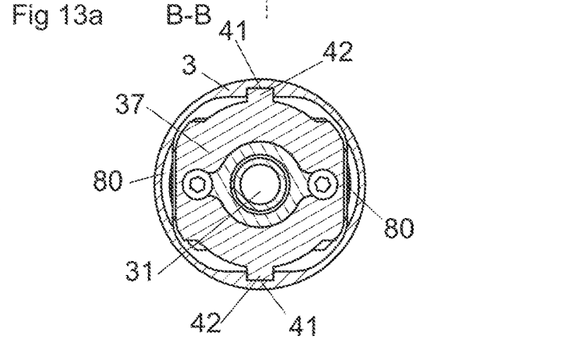
FIG. 13a, 13b show cross-sectional drawings of guide element and locking apparatus.

In FIG. 13a is represented the region B-B from FIG. 12. In this cross-sectional drawing is shown how the guide element 37 engages with its guide portion 42 in the guide groove 41 of the telescopic element 3. The guide element 37 is here connected in a radially play-free manner to the rod 31.

Figure 13B:
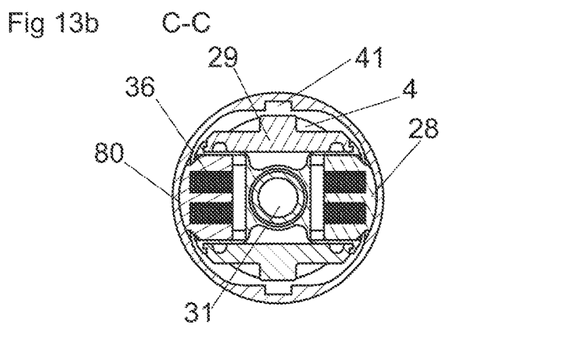

FIG. 13b shows the section C-C from FIG. 12. It can here be seen how the at least one latching element 28 engages in the radial groove 80. This is realized by the restoring unit 36. Should the at least one latching element 28 be pulled out of the radial groove 80, it is necessary to work against the restoring forces of the restoring unit 36. This is realized via actuation of the actuator 27 (not represented in this drawing). The guide groove 41 is arranged offset by 90° relative to the center of the at least one radial groove 80.

Figure 14A:
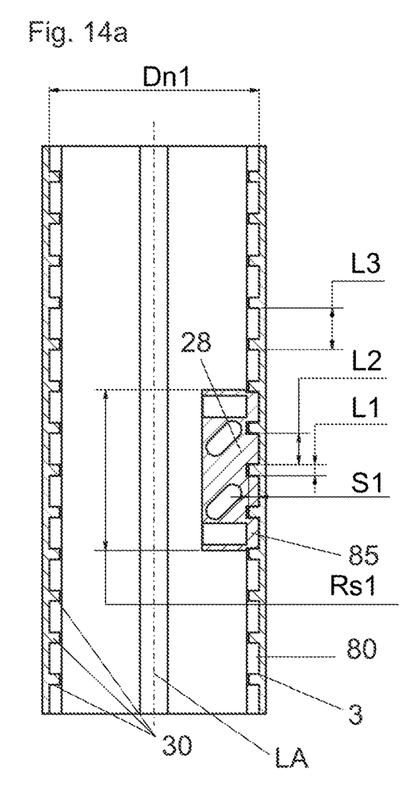
FIG. 14a, 14b show design details of latching mechanism and locking apparatus.
Figure 14B:
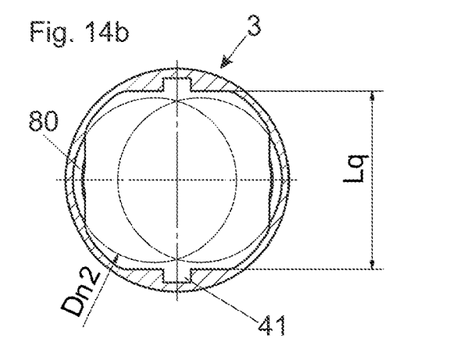

FIG. 14a shows a sectional representation of the positioning apparatus 40. The latching mechanism 30 extends with a latch spacing L3 along the telescopic element 3. The latch spacing L3 preferably amounts to 6 mm. This enables a positioning of the at least one latching element 28 at 6 mm intervals along the longitudinal axis LA of the positioning apparatus 40, and thus a length adjustment in 6 mm steps. According to the type of use of the positioning apparatus 40, this value can vary. The maximum internal diameter of the tubular telescopic element 3—hereinafter referred to as groove diameter Dn1—is 30 mm. According to the type of use of the positioning apparatus 40, this value can vary. It is important, however, that the values in a certain type are correlated in order to obtain an optimum stability and also latching connection, combined with a compact construction. The radial grooves 80 for receiving at least one cam 85 of a latching element 28 are configured as follows: the latching groove width L2 has a value of 4.5 mm and the latching flank height S1 a value of 1.5 mm. Correspondingly thereto, the at least one cam 85 is configured with a slight undersize in order to be able to engage in a play-free manner in the at least one radial groove 80. A latching element 28 has at least one cam 85. An embodiment having at least 2 cams 85 is to be preferred, preferably 4 cams are employed on a latching element 28. The effective length of the latching element, measured in the mounted state along the longitudinal axis LA, amounts to 23 mm. The groove shape diameter Dn2, shown in FIG. 14b—a cross-sectional drawing of the telescopic tube 3—is calculated from the transverse distance Lq. This amounts to 25.5 mm.

The following calculations show the relationships of the measurements one to another:

$$Dn2 = Lq \times 0.95$$

$$Dn1/20 = S1$$

$$S1 \times 1 \text{ to } S1 \times 9 = S1$$

$$D1/10 \text{ to } D1/2 = L3$$

$$Dn1/1.3 = Rs1.$$

Figure 15A:
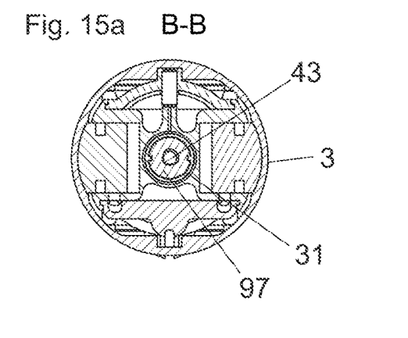
FIG. 15a, 15b show cross-sectional drawing and sectional representation of positioning apparatus with stop spindle.
Figure 15B:
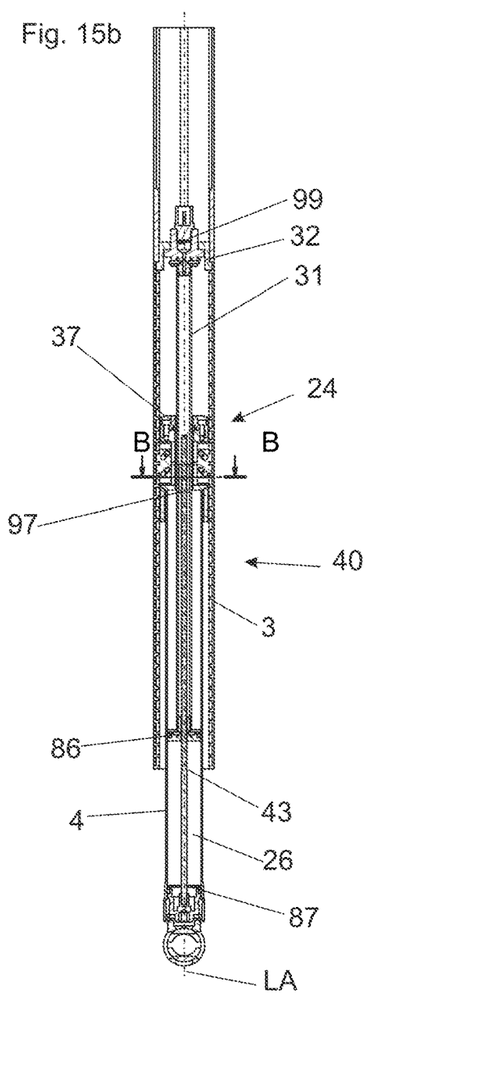

FIG. 15a shows a stop spindle 43 in a stop nut 97 in a rod 31 in cross section. By a thread inside the stop nut 97, which thread corresponds with a thread on the stop spindle 43 and with a twist-proof and linearly sliding mounting between rod 31 and stop nut 97, by a rotary movement of the rod 31 about the longitudinal axis LA, by virtue of the thread pitch, the position of the stop nut 97 relative to the stop spindle 43 is altered. On the rod 31 is found, for instance, a piston 86 of a gas cylinder acting as an energy accumulator 26, as can be seen in FIG. 15b. Through the alteration of the rotational position of the rod 31, in this illustrative embodiment the piston rod of the gas cylinder, which latter simultaneously constitutes the supporting element 4, the position of the stop nut 97 relative to the stop spindle 43 is altered, wherein the stop spindle 43 is fixedly mounted on the cylinder bottom 87. As a result of this alteration, the piston 86, according to the setting of the stop nut 97 relative to the stop spindle 43, enters either sooner or later, upon a movement of the rod 31, into contact with the stop nut 97, thereby forming an adjustable stroke limitation of the positioning apparatus 40.

The adjustment of the rod 31 relative to the stop spindle 43 can be realized without tools or by the use of a tool. The rod 31 is reachable, for example, through the upper end of the positioning apparatus 40. Through the loosening of the contact between the telescopic element 3 and the guide element 37 and, upon a twist-proof, but linearly sliding contact between rod 31 and telescopic element 3, the stop position can be adjusted by the rotation of the telescopic element 3. This corresponds to an adjustment of the seat height by a rotation of the seat.

The movement of the rod 31 along the longitudinal axis LA is damped; this can be realized, for instance, via throttling ports or end position damping means on the piston 86. A throttling of the extension speed in just one direction is possible, for which purpose a nonreturn element is additionally placed on the piston, whereby the seat extends in a controlled manner, yet no additional counterforce is generated in the sinking as a result of body weight.

The rod adapter 99 and the rod locking mechanism 32 are mounted rotatably relative to each other about the axis LA. Along the axis LA exists a releasable connection, which can be realized either non-positively via mechanical latches or circularly arranged magnets, or positively via a removable nut or a removable retaining ring. In the case of a non-positive connection between rod adapter 99 and rod locking mechanism 32, this, given an open position of the locking apparatus 24 (see FIG. 9), can be released by the application of a specific minimum force on the telescopic element 3. This corresponds to a toolless removal of the telescopic element 3.

Figure 16A:
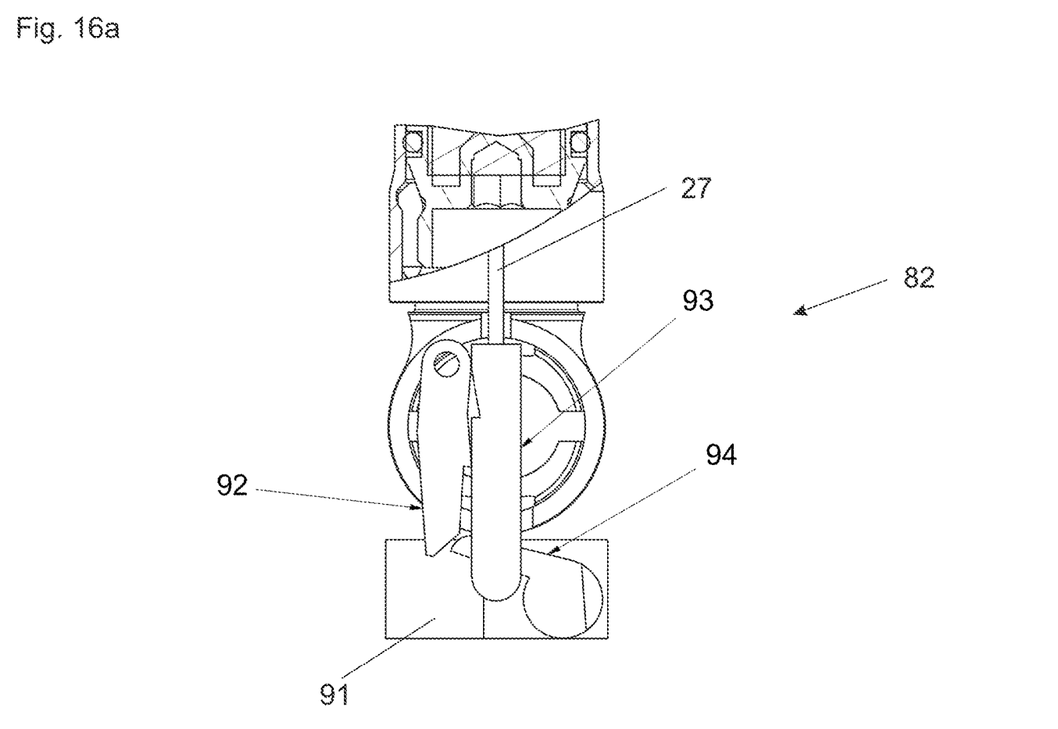
FIG. 16a, 16b show remote control and energy source.
Figure 16B:
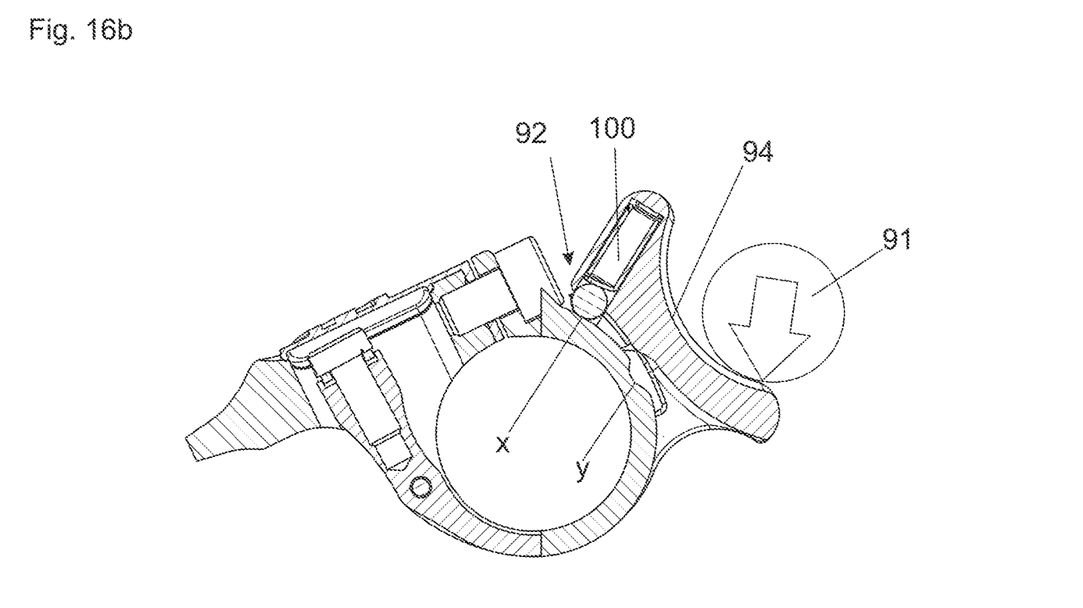

FIGS. 16a and 16b shows a remote control 82 with device for the abrupt release of the actuator 27. Between an energy source 91, for example formed by a thumb of the user, an electric motor or a cylinder, there exists for the release of the locking apparatus 28 and the actuator 27, a mechanism having a holding component 92, which latter is preferably constructed such that the actuator 27 is held in the release position without further influencing of the energy source 91. Only once a certain release force of the holding component 92 is exceeded or once the holding component 92 is released, is the actuator 27 abruptly released. The immediate and total engagement of the latching elements 28 in the provided latching grooves 80 is thus ensured, and very small latch spacings, combined with low manifestation of operating wear, are achieved.

In FIG. 16a, a servomotor, for instance, is used as the energy source 91. This has an actuating lever 94, which is in operative connection with the catch 92. Through an interaction of actuating lever 94 and catch 92, upon a movement of the servomotor an abrupt displacement of the bolt 93 connected to the actuator is obtained.

In FIG. 16b is shown a remote control 82, which is actuated by means of an external energy source 91, such as, for example, by a thumb or a cylinder. This acts on the actuating lever 94, which is held by a spring element 100 of a catch 92 in a closed position x. This holding in a defined position x or y can be realized, for instance, by a ball seat or detents with corresponding counterpart (ball, ram). If the force of the energy source 91 outweighs the force of the spring element 100, the actuating element 94, and thus also the actuator, passes abruptly into an open position y. The latching elements 28 thus engage abruptly in the latching mechanism 30.

The invention claimed is:

1. An assembly, comprising:
   a bicycle frame having a seat tube with two opposite-situated connecting portions; and
   a telescopic seat post, containing:
      a tubularly configured telescopic element for mounting a seat, said telescopic element being mounted displaceably along a longitudinal axis of said seat tube of said bicycle frame;
      a fastening element; and
      a tubularly configured supporting element being mounted displaceably in said telescopic element, said supporting element having a fastening portion being connectable to said seat tube via said fastening element insertable transversely to the longitudinal axis of said seat tube, said fastening element, in a mounted state, projects through said fastening portion and is connected to both of said connecting portions of said seat tube.

2. The assembly according to claim 1, wherein a fastening of said fastening portion is realized by said fastening element being a releasable fastening element.

3. The assembly according to claim 1, wherein said connecting portions are disposed substantially in a lower half of said seat tube.

4. The assembly according to claimed in claim 1, wherein said seat post has an overload clutch, which in a mounted state, in an event of overload, allows a twisting of said seat post relative to said seat tube about the longitudinal axis.

5. The assembly according to claim 4, wherein said seat post, after the twisting of said overload clutch, can be restored without tools into an original position, or said seat post reverts automatically into the original position.

6. The assembly according to claim 4, wherein said overload clutch is positioned between said supporting element and said fastening portion.

7. The assembly according to claim 1, wherein said fastening portion, together with said fastening element, forms a compensating apparatus, said compensating apparatus in a mounted position of said seat post, compensates said seat tube for production tolerances, obtained in a manufacture of said bicycle frame, between said seat tube and said seat post.

8. The assembly as claimed in claim 7, wherein:
   said compensating apparatus has an outer casing, an insert and a body element;
   said outer casing, in a loose state of said fastening element in said fastening portion, is freely movable relative to said insert, and an assembly of said outer casing and said insert are movable relative to said body element;
   in a fastened state of said fastening element in said fastening portion, said insert is immovable relative to said outer casing and an assembly of said outer casing and said insert is immovable relative to said body element one to another.

9. The assembly according to claim 1, wherein said supporting element has an energy accumulator or is formed by an energy accumulator.

10. The assembly according to claim 9, wherein said energy accumulator element is a gas pressure cylinder.

11. The assembly according to claim 1, further comprising:
   a sliding element disposed on said seat tube, and in said sliding element said telescopic element is mounted displaceably along the longitudinal axis; and
   at least one wiper being disposed on said sliding element.

12. The assembly according to claim 1, wherein:
   said fastening element has a screw connection; and
   a first of said two connecting portions has a fastening thread for said screw connection of said fastening element, and an opposite second of said connecting portions has a seat for said fastening element.

13. A seat post for a bicycle frame having a seat tube with two connecting portions, disposed opposite to each other on the seat tube, for the fastening of the seat post, the seat post comprising:
   a tubularly configured telescopic element for a mounting of a seat, said telescopic element is mounted displaceably along a longitudinal axis of the seat tube;
   a fastening element; and
   a tubularly configured supporting element mounted displaceably in said telescopic element, said supporting element having a fastening portion, being connectable to the seat tube via said fastening element insertable transversely to the longitudinal axis of the seat tube, said fastening element, in a mounted state, projecting through said fastening portion and is connected to both of the connecting portions.

* * * * *